United States Patent
Shaheen et al.

(10) Patent No.: US 7,047,036 B2
(45) Date of Patent: May 16, 2006

(54) METHOD AND APPARATUS FOR HANDOFF BETWEEN A WIRELESS LOCAL AREA NETWORK (WLAN) AND A UNIVERSAL MOBILE TELECOMMUNICATION SYSTEM (UMTS)

(75) Inventors: Kamel M. Shaheen, King of Prussia, PA (US); Brian Gregory Kiernan, Voorhees, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 646 days.

(21) Appl. No.: 10/294,065

(22) Filed: Nov. 14, 2002

(65) Prior Publication Data

US 2004/0203792 A1 Oct. 14, 2004

Related U.S. Application Data

(60) Provisional application No. 60/393,413, filed on Jul. 2, 2002.

(51) Int. Cl.
*H04Q 7/20* (2006.01)

(52) U.S. Cl. ............... 455/552.1; 455/127.4; 455/422.1

(58) Field of Classification Search ............. 455/127.4, 455/168.1, 436, 437, 439, 444, 454, 422.1, 455/426.1, 525, 62, 552.1, 553.1; 370/338, 370/466, 252, 328, 412, 352, 470, 320; 709/205, 709/235, 227
See application file for complete search history.

(56) References Cited

U.S. PATENT DOCUMENTS

| | | | | |
|---|---|---|---|---|
| 5,787,347 A | * | 7/1998 | Yu et al. ..................... | 455/440 |
| 5,999,816 A | * | 12/1999 | Tiedemann et al. ......... | 455/437 |
| 6,061,565 A | | 5/2000 | Innes et al. | |
| 6,112,093 A | * | 8/2000 | Nordlund .................... | 455/450 |
| 6,115,608 A | | 9/2000 | Duran et al. | |
| 6,201,968 B1 | | 3/2001 | Ostroff et al. | |
| 6,353,602 B1 | | 3/2002 | Cheng et al. | |
| 6,546,246 B1 | * | 4/2003 | Bridges et al. .......... | 455/432.1 |
| 2002/0024937 A1 | | 2/2002 | Barnard et al. | |
| 2002/0032034 A1 | * | 3/2002 | Tiedemann et al. ......... | 455/437 |
| 2003/0100307 A1 | * | 5/2003 | Wolochow et al. ......... | 455/440 |
| 2003/0148786 A1 | * | 8/2003 | Cooper et al. .............. | 455/552 |
| 2004/0100913 A1 | * | 5/2004 | Kalliokulju et al. ........ | 370/252 |

OTHER PUBLICATIONS

3GPP TSG CN #9, Hawaii, USA, Sep. 20–22, 2000, Tdoc 3GPP NP–000451.

* cited by examiner

*Primary Examiner*—Jean Gelin
(74) *Attorney, Agent, or Firm*—Volpe and Koenig, P.C.

(57) ABSTRACT

Apparatus and method for providing an automatic handoff process of a user equipment (UE) from either a wireless local area network (WLAN) to a universal mobile telecommunications system (UMTS) or from a UMTS to a WLAN. Handoffs may be initiated by the UE, based upon user preference, signal quality, comparison of location coordinates of the UE and the system to be switched to or signal quality. The available channels of one system may be broadcast to the UE by the other system or the UE may monitor channels of the system to be switched to and lock on to one. The handoff may also be initiated by the UMTS, the selection being power-based.

11 Claims, 7 Drawing Sheets

METHOD AND APPARATUS FOR HANDOFF BETWEEN A WIRELESS LOCAL AREA NETWORK (WLAN) AND A UNIVERSAL MOBILE TELECOMMUNICATION SYSTEM (UMTS)

CROSS REFERENCE TO RELATED APPLICATIONS

This application claims priority from U.S. Provisional Application Ser. No. 60/393,413, filed Jul. 2, 2002, which is incorporated by reference as if fully set forth.

BACKGROUND

The present invention relates to WLAN and UMTS systems. More particularly, the present invention relates to apparatus and techniques for automatic handoff between WLAN and UMTS Systems.

The triggering of a handoff process between a UMTS System and a WLAN System can be performed by a manual handoff process initiated by the user wherein the user knows the existence of the WLAN coverage in the current geographic location and switches "on" its WLAN connection.

Nevertheless, it is extremely desirous to provide an automatic handoff process.

SUMMARY

The present invention is characterized by providing automatic handoff techniques which may be either UE-initiated or system-initiated.

Regarding-UE initiated techniques, the UE detects the existence of a WLAN footprint and initiates the handoff (HO) process based on a user preference. Alternatively, the UE may track the locations of WLAN coverage areas and initiate the HO process within a specific range from the WLAN.

System initiated techniques include the following:

Power measurements requested from the UE by the system which include a set of all WLAN frequencies. The system initiates the HO procedures based on a set of criteria which includes the mobility of the UE and the desired applications, when the UE is within the WLAN coverage area.

As another embodiment, the system tracks the UE location and initiates the HO procedures based on a set of criteria, including mobility of the UE and the requested applications, when the UE is within the WLAN coverage area.

BRIEF DESCRIPTION OF THE DRAWING(S)

The present invention will be understood from consideration of the detailed description and drawings wherein like elements are designated by like numerals, and wherein.

DETAILED DESCRIPTION OF THE PREFERRED EMBODIMENT(S)

Figure 1:
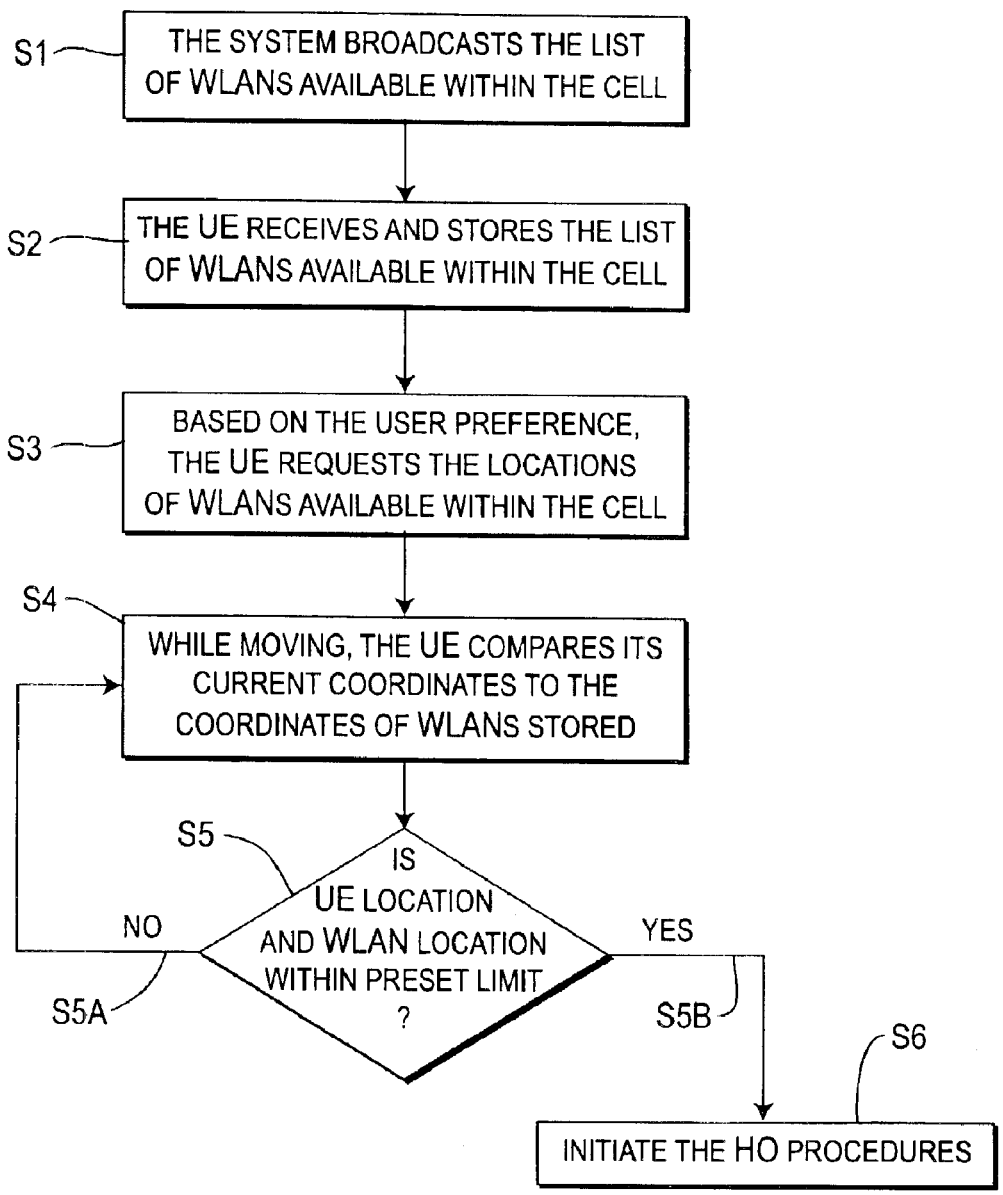
FIG. 1 is a flow diagram showing a UE initiated handoff from a UMTS to a WLAN.

A UE-initiated handoff from an UMTS12 to a WLAN14 is shown in the flow diagram of FIG. 1 wherein, at step S1, the system (UMTS) broadcasts a list of WLANs available within the cell in which the UE10 is located. The UE10 receives and stores a list of all WLANs available within that cell, at step S2. At step S3, the UE10 requests the locations of WLANs available within the cell, said request being based upon user preference. At step S4, the UE10, as it is moving, compares its current coordinates with the coordinates of those WLANs stored. At step S5, a determination is made as to whether the UE10 location and the WLAN14 location are within a preset limit. If not, the program jumps, at step S5A, back to step S4. In the event that the UE10 and WLAN14 locations are within the preset limit, the program jumps, at step S5B, to step S6 whereupon the handoff (HO) procedure is initiated.

Figure 2:
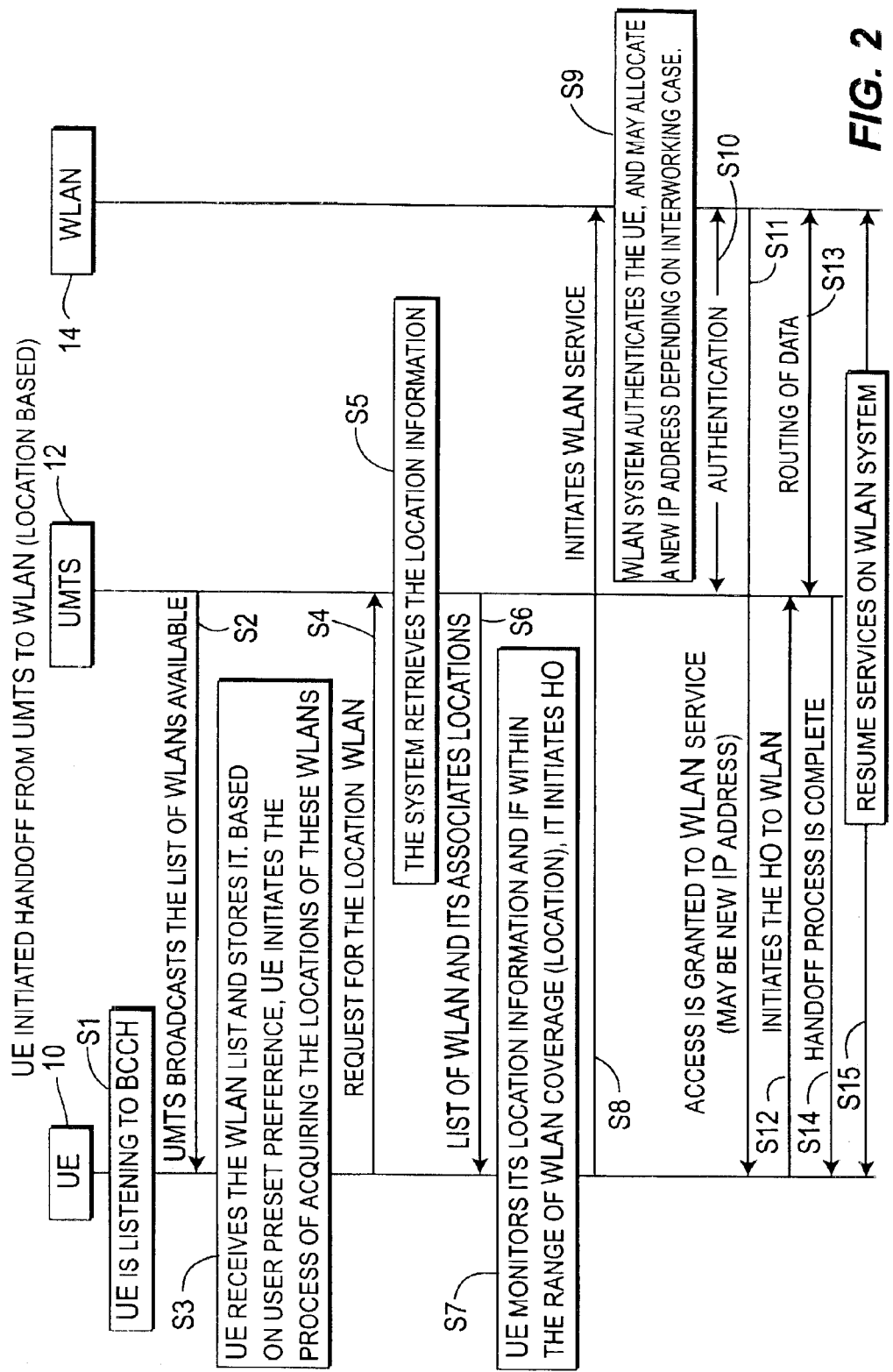
FIG. 2 is a flow diagram showing a UE initiated handoff from a UMTS to a WLAN which is location based.

FIG. 2 shows a more detailed UE-initiated handoff technique which is location based wherein the procedural steps take place between UE 10, UMTS 12 and WLAN 14.

At step S1, UE 10 listens to the broadcast control channel (BCCH). UMTS 12 broadcasts a list of WLANs available, at step S2. At step S3, UE 10 receives and stores the WLAN list and, based upon user preset preference, UE 10 initiates acquisition of the locations of the preferred WLANs and, at step S4, requests that UMTS 12 provide the locations of the preferred WLANs. At step S5, UMTS 12 retrieves the location information and provides UE 10 with a list of the WLANs and its associates locations, at step S6.

At step S7, UE 10 monitors the location information and initiates a handoff (HO) when UE 10 is in the range of the WLAN coverage, UE 10 initiating WLAN service to WLAN 14, at step S8.

WLAN 14, at step S9 authenticates the UE 10 through an interchange of information with UMTS 12, at step S10 and, depending upon the interworking case, at step S11, grants access to UE 10 and may provide a new internet protocol (IP) address depending on the interworking case.

UE 10, at step S12, initiates the handoff to the WLAN through UMTS 12, data being routed through a communication link between UMTS 12 and WLAN 14, at step S13.

UMTS 12, at step S14, provides a message to UE 10 that the handoff process is complete and, at step S15, services are resumed on the WLAN system 14 between UE 10 and WLAN 14.

Figure 3:
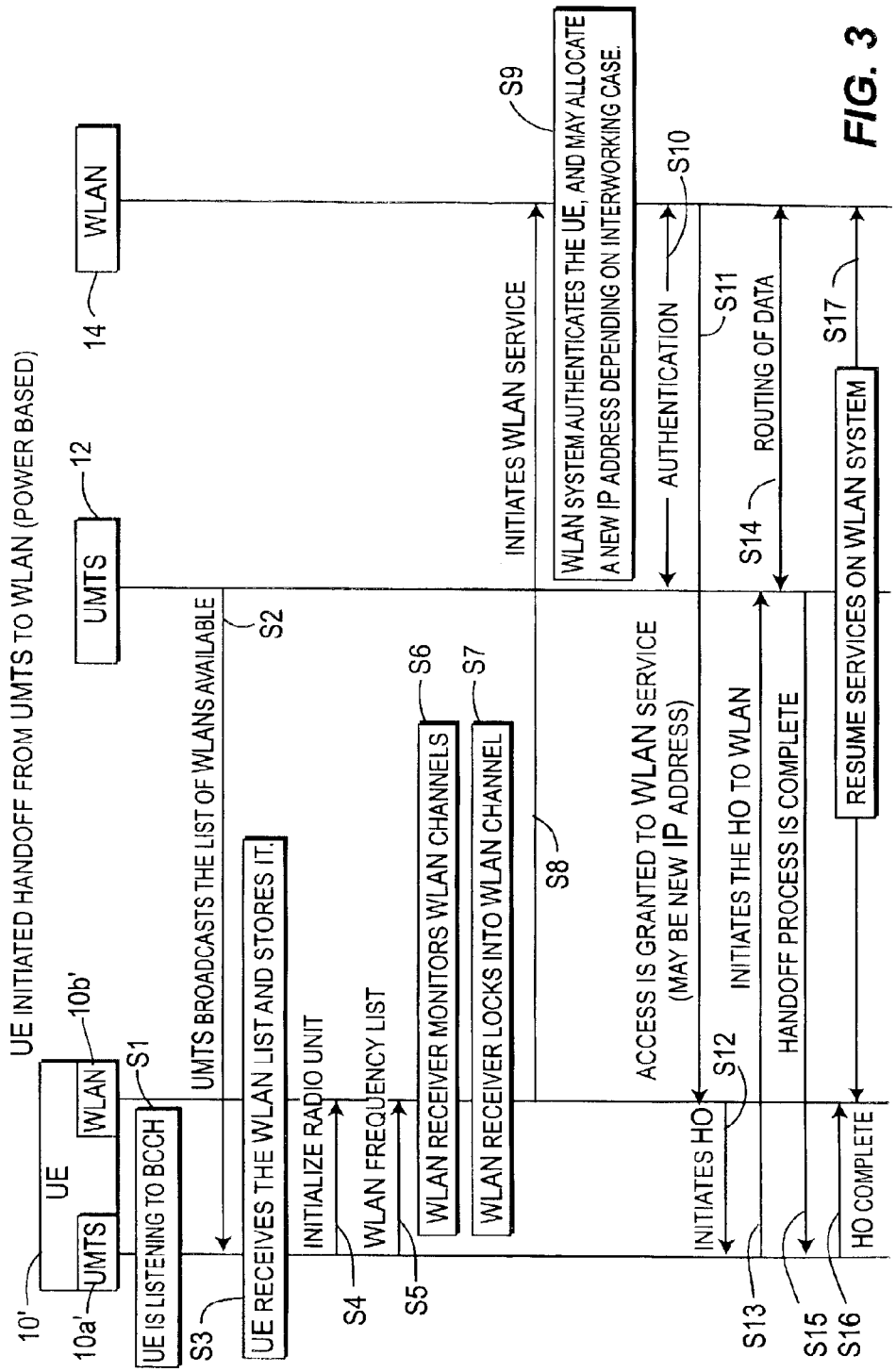
FIG. 3 is a flow diagram showing a UE initiated handoff from a UMTS to a WLAN which is power based.

FIG. 3 shows another technique for a UE initiated handoff from a UMTS 12 to a WLAN 14, UE 10' having communication capability with the UMTS 12 at 10a' and with the WLAN14, at 10b'.

At step S1, UE 10' listens to the broadcast channel (BCCH), UMTS 12, at step S2, broadcasting the list of available WLANs in the channel.

UE 10', at step S3, receives and stores the WLAN frequency list. UE 10' initializes radio unit 10b' at step S4 and, at step S5, transmits the WLAN frequency list to 10b'. The WLAN receiver 10b' monitors the WLAN channels, at step S6 and, at step S7, locks onto a WLAN channel and initiates WLAN service with WLAN 14, at step S8.

At step S9, WLAN 14 authenticates the UE 10' through an interchange of information with UMTS 12, at step S10. At step S11, WLAN 14 grants access to WLAN service and may allocate a new IP address depending upon the interworking case. The handoff is initiated between 10b' and 10a' at step S12 and 10a, at step S13, initiates the handoff to WLAN 14 through UMTS 12 which routes data to WLAN 14, at step S14.

UMTS 12, at step S15, alerts unit 10a' that the handoff process is complete and 10a', at step S16 alerts 10b' that the HO process is complete, whereupon services on the WLAN system are resumed between UE 10' and WLAN 14, at step S17.

Figure 4:
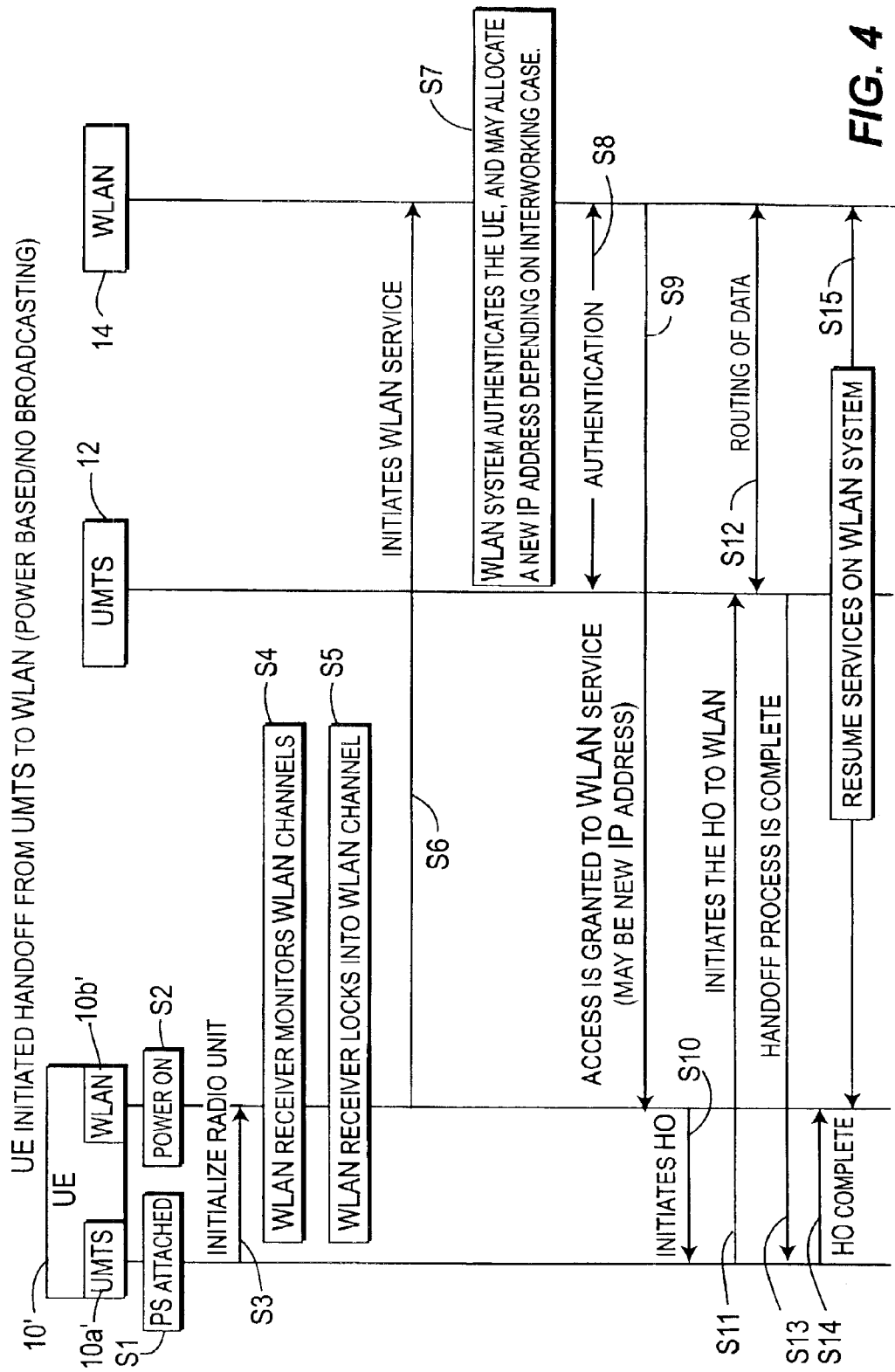
FIG. 4 is a flow diagram showing a UE initiated handoff from a UMTS to a WLAN, which is power based with no broadcasting.

FIG. 4 shows a UE-initiated handoff technique from UMTS 12 to WLAN 14 wherein UE 10' shown in FIG. 4 is similar in structure to the UE 10' shown in FIG. 3. In this embodiment, the handoff is power based and no broadcasting takes place.

The packet switched (PS) is attached, at step S1, from unit 10a' and the power at 10b' is turned on, at step S2. Unit 10a', at step S3, initializes the radio unit of 10b', whereupon 10b', at step S4, has its receiver monitor WLAN channels, locking onto a WLAN channel, at step S5, and initiating WLAN service with WLAN 14, at step S6.

WLAN 14 authenticates UE 10', at step S7, through an authentication procedure with UMTS 12, at step S8, and grants access to WLAN service at step S9 and may allocate a new IP address depending on the interworking case.

Unit 10b', at step S10, initiates the handoff (HO) with unit 10a' which, at step S11, initiates the handoff to WLAN 14 through UMTS 12, which is routed between UMTS 12 and WLAN 14, at step S12, and UMTS 12 alerts unit 10a' that the handoff process is complete, at step S13. Unit 10a', at step S14, alerts unit 10b' that the handoff is complete, whereupon services on the WLAN system are resumed between UE 10' and WLAN 14, at step S15.

Figure 5:
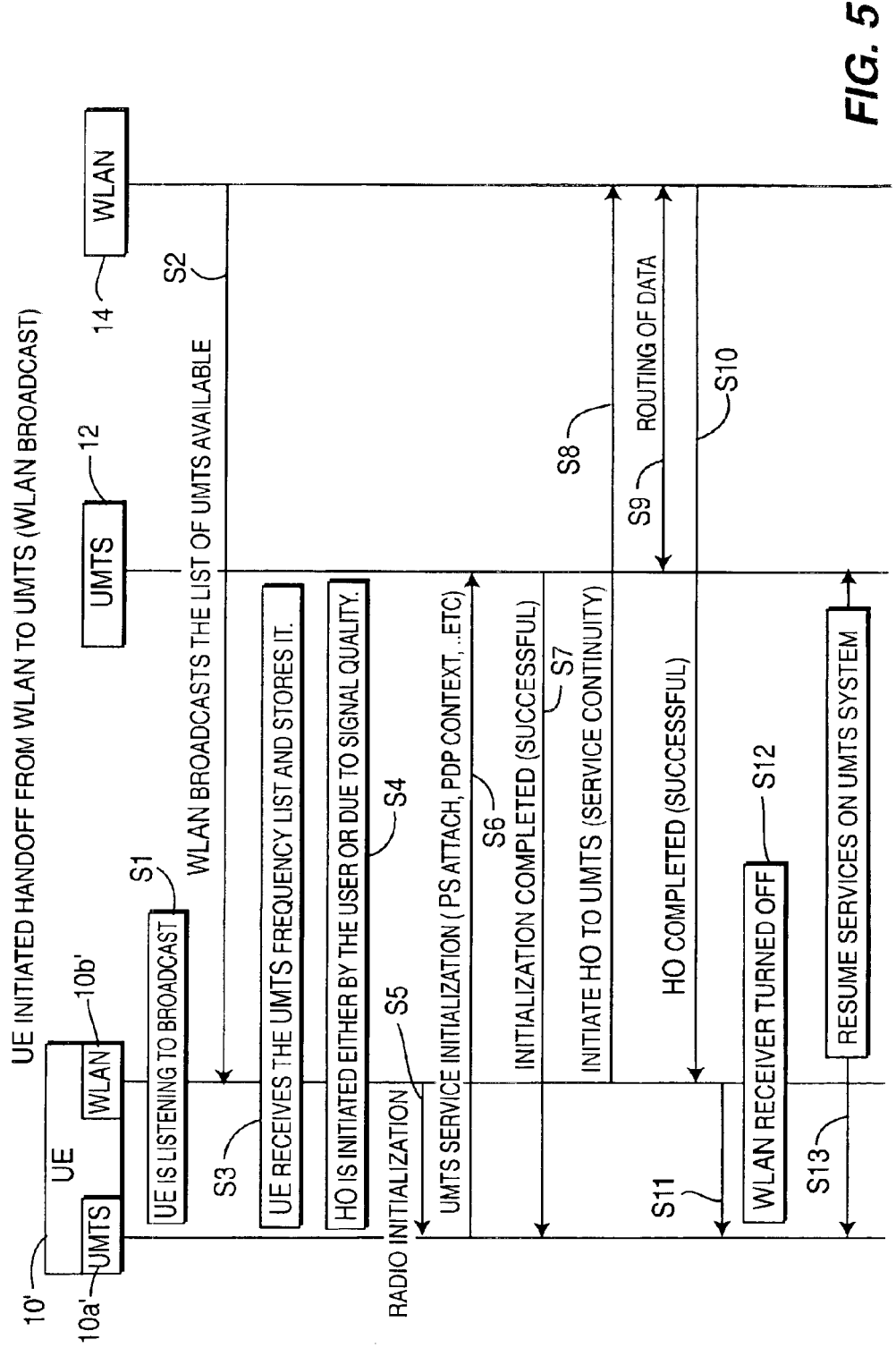
FIG. 5 is a flow diagram showing a UE initiated handoff from a WLAN to a UMTS employing a WLAN broadcast technique.

FIG. 5 shows another UE-initiated handoff technique utilizing a WLAN broadcast. UE 10' is similar to UE 10' shown in FIGS. 3 and 4.

The UE, through unit 10b', listens to the broadcast, at step S1, the broadcast of the list of UMTSs available being provided by WLAN 14, at step S2. UE 10' through unit 10b', receives and stores the UMTS frequency list, at step S3, and initiates handoff (HO) by way of a user initiation or, based on signal quality, at step S4, when the HO is initiated, the user selects a preset preference. When signal quality is used as a criteria, a measure of the signal quality is made and HO is initiated when the signal quality achieves a predetermined threshold.

Upon initiation of the handoff, 10b', at step S5, causes radio initialization at unit 10a'. Unit 10a', at step S6, starts UMTS service initialization, which includes package switched (PS) attached, packet data protocol (PDP) context and so forth. UMTS 12, at step S7, completes initialization advising unit 10a' that initialization is successful. At step S8, UE 10', through unit 10b', initiates the handoff to the UMTS (service continuity). At step S9, the routing of data occurs between WLAN 14 and UMTS 12, whereupon WLAN 14, at step S10, alerts unit 10b' that the handoff is completed (and it was successful). Unit 10b', at step S11, alerts 10a' that the handoff is completed and turns the WLAN receiver off, at step S12, whereupon services are resumed on the WLAN system between UMTS 12 and unit 10a', at step S13.

Figure 6:
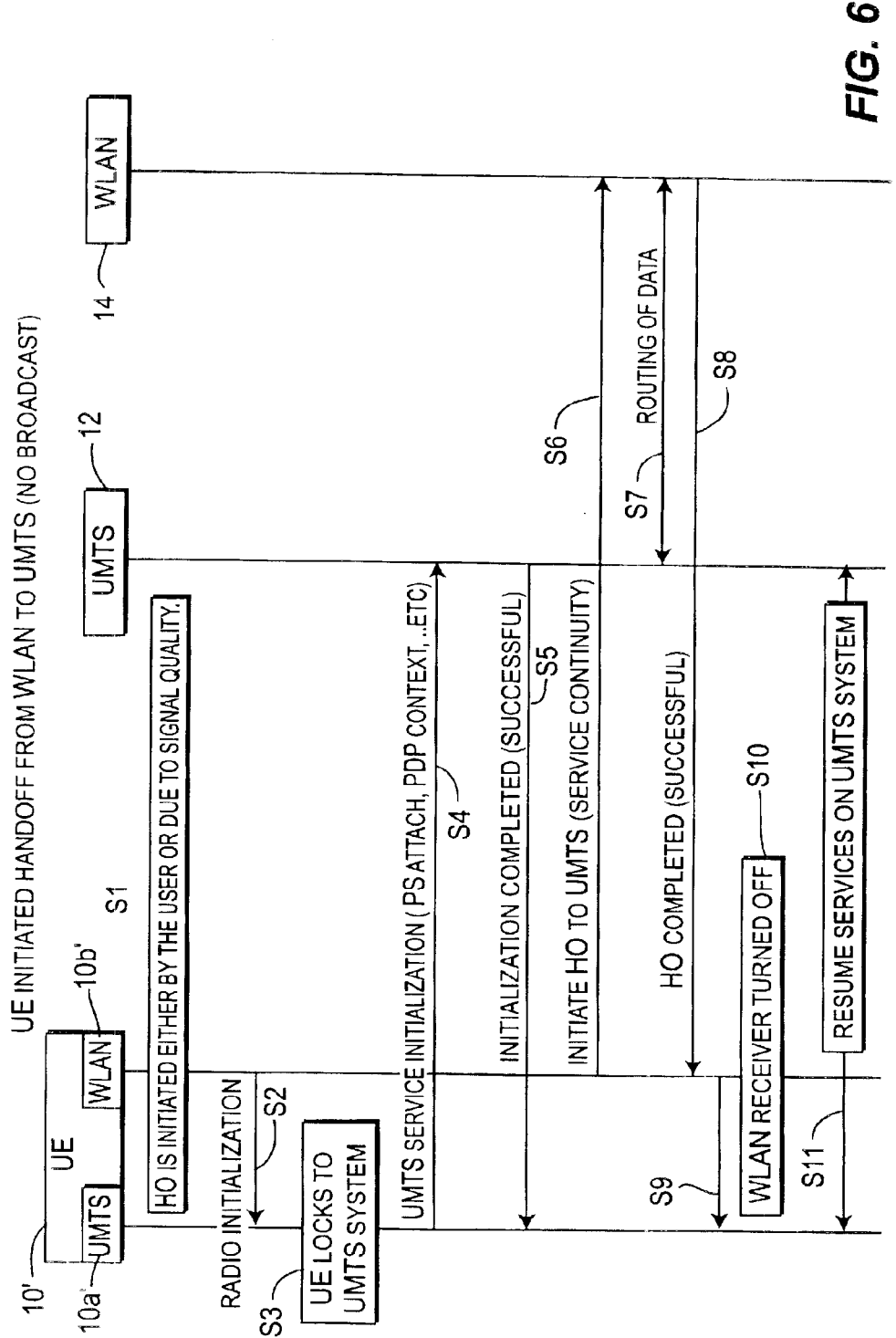
FIG. 6 is a flow diagram showing a UE initiated handoff from a WLAN to a UMTS where there is no broadcast.

FIG. 6 shows a UE-initiated handoff from a WLAN 14 to an UMTS 12. In this embodiment, UE 10', through unit 10b', initiates a handoff either by the user or automatically, due to signal quality, at step S1, the procedures herein being substantially identical to those described in connection with step S4 in the embodiment of FIG. 5.

Unit 10b', at step S2, causes radio initialization at 10a' which, at step S3, locks onto the UMTS system 12, and performs UMTS service and initialization, which step is substantially identical to step S6 shown in the embodiment of FIG. 5. Thereafter, steps S5 through S11 of FIG. 6 which are substantially identical to steps S7 through S13, respectively shown in FIG. 5, are performed, the difference between the embodiments of FIG. 5 and FIG. 6 being that there is no WLAN broadcast in the embodiment of FIG. 6.

Figure 7:
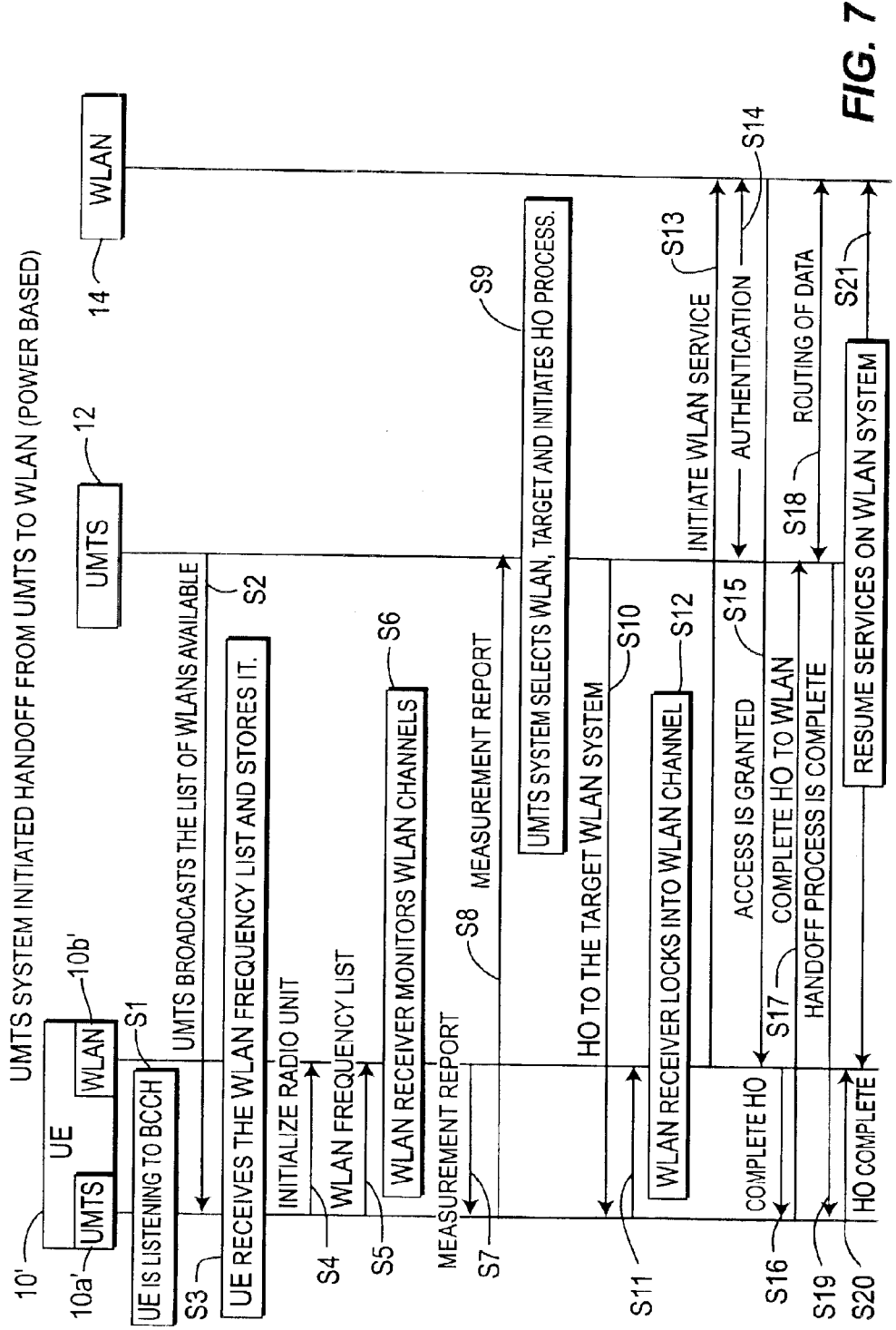
FIG. 7 is a flow diagram showing a UMTS system initiated handoff of a UE from a UMTS to a WLAN, which is power based.

FIG. 7 shows a UMTS system initiated handoff from a UMTS 12 to WLAN 14, the handoff technique being power based.

UE 10', through unit 10a' listens to the broadcast channel (BCCH) at step S1, UMTS 12 broadcasting a list of WLANs available, at step S2. UE 10', through unit 10a', receives and stores the WLAN frequency list, at step S3 and, at step S4, initializes the radio unit at 10b' providing the frequency list to unit 10b', at step S5. The WLAN receiver, at unit 10b', monitors the WLAN channels, at step S6, providing a measurement report to unit 10a' at step S7, which report is relayed from unit 10a' to UMTS 12, at step S8.

UMTS 12, at step S9, targets a specific WLAN and initiates the handoff process, providing the target WLAN system of the handoff process to unit 10a', at step S10.

UE 10', through unit 10a' alerts unit 10b' of the target WLAN system and the WLAN receiver of unit 10b' locks onto the WLAN channel of the target WLAN system, at step S12 and communicates with WLAN 14 to initiate the WLAN service, at step S13.

WLAN 14 authenticates UE 10' through communication with UMTS 12, at step S14 and, at step S15, grants access by communicating with unit 10b' which, at step S16, alerts unit 10a' that the handoff is complete. Unit 10a', at step S17, alerts UMTS 12 that the handoff to WLAN 14 is complete, whereupon UMTS 12 routes data to WLAN 14, at step S18. UMTS 12, at step S19, advises unit 10a' that the handoff process is complete, whereupon, unit 10a', at step S20, advises unit 10b' that the process is complete, whereupon service on the WLAN system between UE10' and 14 takes place, at step S21.

What is claimed is:

1. A user equipment (UE) initiated method for automated handoff of the UE from a first system to a second system, said first system being one of a universal mobile telecommunication system (UMTS) and a wireless local area network (WLAN) and the second system being a remaining one of the UMTS and WLAN, comprising:

a) said first system broadcasting a list of second systems available;

b) said UE receiving and storing a list of those second systems available within a cell in which the UE is located;

c) the UE requesting a location of those second systems available within the cell based on preferences of the user of the UE; and d) said UE comparing its coordinates with coordinates of the second systems received from the first system and initiating a handoff procedure when the comparison operation indicates that the second system is within a preset limit.

2. A user equipment (UE) initiated handoff method for handoff of the UE from a first system to a second system wherein said first system is one of a universal mobile telecommunication system (UMTS) and a wireless local area network (WLAN) and said second system is a remaining one of the UMTS and WLAN, comprising:
  a) said first system broadcasting a list of second systems available;
  b) said UE receiving and storing the list;
  c) said UE monitoring channels of second systems available and locking on to one channel to initiate service with the second system on said one channel;
  d) said second system authenticating the UE and granting access;
  e) said UE initiating the handoff to the second system through communication with the first system;
  f) said first system routing data through said second system and advising the UE when the handoff process is complete; and
  g) said UE assuming services with said second system responsive to a message received from the first system that the handoff process is complete.

3. The method of claim 2 wherein step (c) includes:
  h) comparing the signal in said one channel with a threshold; and
  i) locking on to said one channel when the signal is at least equal to said threshold.

4. A dual-mode user equipment (UE) capable of communicating with a wireless local area network (WLAN) when in a WLAN mode and with a universal mobile telecommunication system (UMTS) when in a UMTS mode for handoff of the UE from a WLAN to a UMTS, comprising:
  a) said WLAN broadcasting a list of available UMTS;
  b) said UE, in the WLAN mode, receiving and storing the UMTS list;
  c) said UE initiating a handoff and causing radio initialization of the UMTS mode;
  d) said UE in the UMTS mode providing UMTS service initialization to the UMTS;
  e) said UMTS completing initialization;
  f) said UE, in the WLAN mode initiating a handoff to the UMTS with the WLAN;
  g) said WLAN providing for routing for data with the UMTS;
  h) said WLAN advising the UE that the handoff is complete; and
  i) said UE closing down the WLAN mode and resuming services with the UMTS in the UMTS mode.

5. The method of claim 4 wherein step (c) includes:
  h) comparing the signal in said one channel with a threshold; and
  i) locking on to said one channel when the signal is at least equal to said threshold.

6. A dual-mode user equipment (UE) capable of communicating with a wireless local area network (WLAN) when in a WLAN mode and with a universal mobile telecommunication system (UMTS) when in a UMTS mode for handoff of the UE from a WLAN to a UMTS, comprising:
  a) said UE, in the WLAN mode, monitoring WLAN channels;
  b) said UE locking on a WLAN channel and initiating a handoff and causing radio initialization of the UMTS mode;
  c) said UE in the UMTS mode providing UMTS service initialization to the UMTS;
  d) said UMTS completing initialization;
  e) said UE, in the WLAN mode initiating a handoff to the UMTS with the WLAN;
  f) said WLAN providing for routing for data with the UMTS;
  g) said WLAN advising the UE that the handoff is complete; and
  h) said UE closing down the WLAN mode and assuming services with the UMTS in the UMTS mode.

7. The method of claim 6 wherein step (b) includes:
  h) comparing the signal in said one channel with a threshold; and
  i) locking on to said one channel when the signal is at least equal to said threshold.

8. A user equipment (UE) initiated handoff method for use by a dual mode UE capable of operating in a wireless local area network (WLAN) mode and a universal mobile telecommunication system (UMTS) mode for handoff of the UE from a UMTS to a WLAN, comprising:
  a) said UMTS broadcasting a list of available WLANs;
  b) said UE, in the UMTS mode receiving and storing the list of WLANs;
  c) said UE, in the UMTS mode initializing radio operation in the WLAN mode;
  d) said UE, in the UMTS mode providing UE, in the WLAN mode a list of WLAN frequencies;
  e) said UE, in the WLAN mode monitoring WLAN channels;
  f) said UE, in the UMTS mode providing a measurement report to the UMTS;
  g) said UMTS selecting a WLAN target and initiating a handoff process;
  h) said UMTS providing to the UE, in the UMTS mode a target WLAN system;
  i) said UE in the UMTS mode, triggering the WLAN mode to lock on to the channel of the target WLAN and initiate WLAN service;
  j) said UMTS and WLAN interfacing to provide authentication for the WLAN service, said WLAN granting access to the UE in the WLAN mode;
  k) said UE in the WLAN mode advising the UMTS mode that the handoff has been complete;
  l) said UE in the UMTS mode acknowledging completion of the handoff; and
  m) said UE, in the WLAN mode assuming services on the WLAN system.

9. A user equipment (UE) initiated system for automated handoff of the UE from a first system to a second system, said first system being one of a universal mobile telecommunication system (UMTS) and a wireless local area network (WLAN) and the second system being the remaining one of the UMTS and WLAN, comprising:
  said first system having means for broadcasting a list of the second systems available;
  said UE having means for receiving and storing lists of those systems available within the cell in which the UE is located;
  the UE having means for requesting a location of those second systems available within the cell based on preferences of the user of the UE; and
  said UE having means for comparing its coordinates with coordinates of the second systems received from the first system and initiating a handoff procedure when the comparison operation indicates that the second system is within a preset limit.

10. UE initiated handoff system for handing off the UE from a first system to a second system wherein said first system is one of a UMTS and a WLAN and said system is a remaining one of the UMTS and WLAN, comprising:

said first system having means for broadcasting a list of second systems available;

said UE having means for receiving and storing the list;

said UE having means for monitoring channels of said second system and locking on to one channel to initiate service with a second system on said channel;

said second system having means for authenticating the UE and granting access;

said UE having means for initiating the handoff to the second system through communication with the first system;

said first system having means for routing data through said second system and advising the UE when the handoff process is complete; and said UE having means for assuming services with said second system responsive to the message received from the first system that the handoff process is complete.

11. A UE initiated handoff of a UE from a first system to a second system wherein said first system is one of a UMTS and a WLAN and said second system is a remaining one of the UMTS and WLAN, comprising:

said first system broadcasting a list of second systems channels available;

said UE receiving and storing the list;

said UE monitoring channels of said second system and locking on to one channel when a signal quality of said one channel reaches a given threshold;

said second system authenticating the UE and granting access;

said UE initiating the handoff to the second system through communication with the first system;

said first system routing data through said second system and advising the UE when the handoff process is complete; and said UE assuming services with said second system responsive to the message received from the first system that the handoff process is complete.

* * * * *

UNITED STATES PATENT AND TRADEMARK OFFICE
CERTIFICATE OF CORRECTION

| | |
|---|---|
| PATENT NO. | : 7,047,036 B2 |
| APPLICATION NO. | : 10/294065 |
| DATED | : May 16, 2006 |
| INVENTOR(S) | : Shaheen et al. |

It is certified that error appears in the above-identified patent and that said Letters Patent is hereby corrected as shown below:

Title page, item [57]          IN THE ABSTRACT

At right column, page 1, line 10, after the words "to and", delete "lock" and insert therefor --locked--.

At Sheet 2 of 7, FIG. 2, area S6, delete "LIST OF WLAN AND ITS ASSOCIATES LOCATIONS" and insert therefor
--LIST OF WLANs AND THEIR ASSOCIATED LOCATIONS--.

At Sheet 3 of 7, FIG. 3, area S7, delete "WLAN RECEIVER LOCKS INTO WLAN CHANNEL" and insert therefor --WLAN RECEIVER LOCKS ONTO WLAN CHANNEL--.

At Sheet 4 of 7, FIG. 4, area S5, delete "WLAN RECEIVER LOCKS INTO WLAN CHANNEL" and insert therefor --WLAN RECEIVER LOCKS ONTO WLAN CHANNEL--.

At Sheet 7 of 7, FIG. 7, area S12, delete "WLAN RECEIVER LOCKS INTO WLAN CHANNEL" and insert therefor --WLAN RECEIVER LOCKS ONTO WLAN CHANNEL--.

At column 2, line 37, after the words "WLANs and", delete "its associates" and insert therefor --their associated--.

At column 3, line 6, after the words "S12 and", delete "10a" and insert therefor --10a'--.

At column 3, line 66, before "UMTS", delete "an" and insert therefor --a--.

At claim 1, column 4, line 52, after the word "system", delete "broadcasting" and insert therefor --sending--.

At claim 2, Column 5, line 5, after the words "first system", delete "broadcasting" and insert therefor --sending--.

At claim 4, column 5, line 33, after "WLAN", delete "broadcasting" and insert therefor --sending--.

UNITED STATES PATENT AND TRADEMARK OFFICE
CERTIFICATE OF CORRECTION

PATENT NO. : 7,047,036 B2
APPLICATION NO. : 10/294065
DATED : May 16, 2006
INVENTOR(S) : Shaheen et al.

It is certified that error appears in the above-identified patent and that said Letters Patent is hereby corrected as shown below:

At claim 4, column 5, line 33, after the word "available", delete "UMTS;" and insert therefor --UMTSs;--.

At claim 5, column 5, line 51, before the word "comparing", delete "h)" and insert therefor --j)--.

At claim 5, column 5, line 54, before the word "locking", delete "i)" and insert therefor --k)--.

At claim 6, column 5, line 63, after the words "locking on", insert --to--.

At claim 7, column 6, line 12, before the word "comparing", delete "h)" and insert therefor --i)--.

At claim 7, column 6, line 14, before the word "locking", delete "i)" and insert therefor --j)--.

At claim 8, column 6, line 21, after "UMTS", delete "broadcasting" and insert therefor --sending--.

At claim 8, column 6, line 45, after the word "been", delete "complete;" and insert therefor --completed;--.

At claim 9, column 6, line 56, after the words "means for", delete "broadcasting" and insert therefor --sending--.

At claim 10, column 7, line 7, after the words "means for", delete "broadcasting" and insert therefor --sending--.

At claim 11, column 8, line 6, after the words "first system", delete "broadcasting" and insert therefor --sending--.

UNITED STATES PATENT AND TRADEMARK OFFICE
CERTIFICATE OF CORRECTION

PATENT NO. : 7,047,036 B2
APPLICATION NO. : 10/294065
DATED : May 16, 2006
INVENTOR(S) : Shaheen et al.

It is certified that error appears in the above-identified patent and that said Letters Patent is hereby corrected as shown below:

At claim 11, column 8, line 6, after the word "second", delete "systems" and insert therefor --system's--.

Signed and Sealed this

Ninth Day of January, 2007

JON W. DUDAS
*Director of the United States Patent and Trademark Office*